(12) United States Patent
Chuntonov

(10) Patent No.: US 8,529,673 B2
(45) Date of Patent: Sep. 10, 2013

(54) SAFE GAS SORBENTS WITH HIGH SORPTION CAPACITY ON THE BASIS OF LITHIUM ALLOYS

(75) Inventor: Konstantin Chuntonov, Haifa (IL)

(73) Assignee: Reactive Metals Ltd., Seoul (KR)

( * ) Notice: Subject to any disclaimer, the term of this patent is extended or adjusted under 35 U.S.C. 154(b) by 696 days.

(21) Appl. No.: 12/765,219

(22) Filed: Apr. 22, 2010

(65) Prior Publication Data

US 2010/0242727 A1    Sep. 30, 2010

Related U.S. Application Data

(63) Continuation of application No. PCT/IL2008/001365, filed on Oct. 22, 2008.

(60) Provisional application No. 60/960,935, filed on Oct. 22, 2007.

(51) Int. Cl.
 *B01D 53/02* (2006.01)
(52) U.S. Cl.
 USPC .............. 96/108; 95/90; 428/402; 252/181.7; 75/331
(58) Field of Classification Search
 USPC ........... 95/90; 428/402; 252/181.7; 75/331; 96/108
 See application file for complete search history.

(56) References Cited

U.S. PATENT DOCUMENTS

| | | | |
|---|---|---|---|
| 6,241,955 B1 | 6/2001 | Alvarez | |
| 6,261,528 B1 | 7/2001 | Carrera | |
| 6,322,720 B1 | 11/2001 | Reutova | |
| 6,436,352 B1 | 8/2002 | Succi | |
| 6,521,192 B1 | 2/2003 | Weber | |
| 6,838,049 B2 | 1/2005 | Fukuzumi | |
| 7,112,237 B2 | 9/2006 | Zeller | |
| 2006/0225817 A1 | 10/2006 | Chuntonov | |
| 2007/0196256 A1 | 8/2007 | Chuntonov | |
| 2007/0205720 A1 | 9/2007 | Sparks | |

FOREIGN PATENT DOCUMENTS

| | | |
|---|---|---|
| EP | 1791152 A1 | 5/2007 |
| EP | 1821328 A1 | 8/2007 |

OTHER PUBLICATIONS

J.D. Baker, D.H. Meikrantz, R.J. Pawelko, R.A. Anderl and D.G. Tuggle Tritium purification via zirconium-manganese-iron alloy getter St 909 in flow processes J. Vac. Sci. Technol. A 12(2), pp. 548-553, Mar./Apr. 1994 American Vacuum Society.
D. Gozzi, M. Iervolino, A. Latini and A. Bellucci Ni—Re intermetallic oxygen getters ScienceDirect, Vacuum 80 (2006) pp. 930-938 USA.
B. Ferrario, A. Figini, and M. Borghi A new generation of porous non-evaporable getters Vacuum/vol. 35/No. 1/pp. 13 to 17/1984 Printed in Great Britain Pergamon Press Ltd United Kingdom.
K. Chuntonov and J. Setina New lithium gas sorbents I. The evaporable variant ScienceDirect Journal of Alloys and Compounds 455 (2008) 489-496.

*Primary Examiner* — Christopher P Jones
(74) *Attorney, Agent, or Firm* — Hamre, Schumann, Mueller & Larson, P.C.

(57) ABSTRACT

A new lithium material with high surface area, a method of its production, and a process of using the given material in purification of hydrogen or inert gases stream from active impurities. The material is manufactured in a form of granules of 0.2-2.5 mm in diameter with the structure of a dendritic carcass and is characterized with high sorption capacity and resistance to chemical shocks.

16 Claims, 8 Drawing Sheets

SAFE GAS SORBENTS WITH HIGH SORPTION CAPACITY ON THE BASIS OF LITHIUM ALLOYS

RELATED APPLICATIONS

This application is a Continuation of International Application No. PCT/IL2008/001365 filed on Oct. 22, 2008, which in turn claims the benefit under 35 USC 119(e) of U.S. Provisional Application No. 60/960,935 filed on Oct. 22, 2007, both of which are incorporated herein by reference in their entirety.

FIELD OF THE INVENTION

The invention relates to the field of metallic gas sorbents intended for purification of hydrogen and noble gases from all active impurities both at room temperature and higher up to ~250° C.

BACKGROUND OF THE INVENTION

Purification of gases from unwanted impurities is one of the most important applications of getter (in other words, purification) materials. The requirements to purification materials used in gas purifiers are diverse and can vary but still there are three problems, which are always actual:
  increase of sorption capacity of the gas sorbent;
  maintenance of the material performance in case of operational failures or breakdowns;
  simplification of the gas sorbent production technology and the reduction of the price for the end product.

These problems are solved by the right choice of a getter material, shaping it into the form and structure, which are preferable from the point of view of the sorption process and also by improvement of the methods of manufacturing of the given materials.

Many high-melting transition metals, rare-earth metals, and also chemically active lithium and barium refer to metals, which are effective in capturing gases. Lithium and barium are unsurpassed gas sorbents, although their usage is avoided because of their high reactivity. The modern getters are based on Ti, V, Zr and Ni, which are more stable in the atmosphere and safe in a compact and dense form.

Metals sorb gases either by dissolving them in their lattice, or reacting with them and forming a layer of chemical compounds on the surface. However, under any sorption mechanism, the fraction of the getter mass involved in the process depends on the size of the active particles and the smaller the particles the higher is the really achieved sorption capacity. Therefore all getter materials are used in a highly dispersed state: films in vacuum applications and powders in gas purification.

The disadvantages of fine metal powders, especially of the powders of a nanometer range, are well known: these are the tendency of the powder particles to coagulation and coalescence and also their high chemical activity. To avoid the first one the volume concentration of nanoparticles is significantly decreased, "diluting" them by another, additional, material. Such dilution is achieved either in mixtures of getter particles with oxides particles [Weber D. K., Vergani G. U.S. Pat. No. 6,521,192, Feb. 18, 2003], or by partial introduction of nanoparticles into the pores of the base sintered material [Zeller R., Vroman C. U.S. Pat. No. 7,112,237, Sep. 26, 2006], or by deposition of metallic nanoparticles onto the surface of an inorganic support carrier material [Succi M., Solcia C. U.S. Pat. No. 6,436,352, Aug. 20, 2002], or by reduction of oxide nanoparticles, which are located on the substrate surface, to a partially metallic state in a flow of a reductant gas [Alvarez, Jr. D. U.S. Pat. No. 6,241,955, Jun. 5, 2001], etc. The sorption capacity of 1 $cm^3$ of mixtures or composites of this type is by many times lower, than of the getter material itself, and their manufacturing technology is very complicated.

As regards the high reactivity of metallic nanopowders, the question arises here about how much reasonable the current relation is between the technical result of purification and the price for it. If nanopowders, e.g. Ti or Ni, immediately burn in the air, than in what way do they surpass Li or Ba, which to all that work better as gas sorbents?

So, as far as a seal failure in the gas system and an ingress of air inside a gas purifier with Ni powder completely disables the latter, and at normal depletion of the gas sorbent resource it is necessary to perform expensive regeneration of the material, then it seems quite reasonable to substitute the transition metals for more active materials, though limited to a single use, but cheap and having high sorption capacity. The recently found [Chuntonov K., Voronin G. F., Malyshev O. B. US Pat. Application 20070196256, Aug. 23, 2007; Chuntonov K., Setina J., New lithium gas sorbents: I. The evaporable variant. *J. Alloys Compd.*, 455, (2008), p. 489] ability of concentrated solid solutions of Li in Ag, Cu and in some other corrosion-resistant metals to self-passivation supports those reasons and makes it possible to develop safe getters with a very high sorption capacity. It is quite clear, that the development of the new getters of this type should start with the creation of a high porous gas-permeable structure.

From the known methods of production of getter alloys with high surface area the most commonly used is the technology of pressing the metallic powders and further sintering the pressed powder in vacuum [Ferrario B., Figini A., Borghi. Vacuum 35 (1984) 13; Reutova N. P., Maneghin S. J., Pustovoit J. M., Stoljarov V. L., Akimenko V. B. U.S. Pat. No. 6,322,720, Nov. 27, 2001]. However this technology is inapplicable to solid solutions Ag—Li, Cu—Li etc. due to their softness and ductility, which not only impede the production of such powders, but also make their further thermo-mechanical treatment impossible.

The most suitable method of loosening the structure of lithium alloys is the sublimation method [Chuntonov K. US Pat. Application 20060225817, Oct. 12, 2006; Chuntonov K., Ipser H., Richter K. EP1821328, Feb. 10, 2006], which was recently successfully applied to rapidly cooled eutectic alloys. According to this method an alloy, containing a non-volatile phase with a developed dendritic carcass as a structural basis and a volatile phase as an addition, which fills the space between the dendritic arms of the first one, is heated not going beyond the range of subsolidus temperatures to remove the volatile phase. As a result a solid residue in a form of a dendritic skeleton with end-to-end channels, along which gases can penetrate into the depth of the material, is formed.

The problem, however, is that the sublimation method according to the cited documents, is effective only when it is applied to binary, ternary or multi-phase alloys, but not to single phase ones like solid solutions Li-Me, where Me=Ag, Au, Co, Cu, and Mg. It is also necessary to have in mind that from the mentioned metals Me the first two, Ag and Au, belong to noble ones, while the next two, Co and Cu, melt under the temperatures close to or even higher than the boiling point of lithium, which makes metallurgical procedures with them more difficult.

It follows from the above said, that two problems have to be solved for the creation of high porous gas sorbents on the basis of passivating Li-Me alloys:

1. To adjust the alloys of solid solution of lithium type to the sublimation method, so that after quenching of the melt and the further vacuum evaporation of the volatile constituent, a passivated or able to passivation dendritic carcass of the material with high lithium concentration should appear.

2. To optimize the adapted according to item 1 alloy composition, so that that the price for the end product should be maximally reduced and the process for its production—maximally simplified without damaging its sorption properties.

The solution for these problems for the case of Li-containing sphere-like particles in the range from several tenth of a millimeter to several millimeters in diameter is given below. These particles with the dendritic structure promise to become an ideal purification material for gas purifiers in the temperature range from room temperature to ~250° C.

SUMMARY OF THE INVENTION

A new gas sorbent consists of dendritic granules with the diameter from ~0.2 mm to ~2.5 mm of the composition AgLi$_2$Mg or (Ag$_x$Cu$_{1-x}$)$_{0.6}$Li$_{0.4}$, where $0.6<x<0.75$. Compared with the most active solid solutions Ag-50 at % Li, the given alloys allow halving in the average the consumption of Ag. At this the set of getter characteristics considerably widens, especially due to the sorption activity of Mg.

The additional advantage of the new gas sorbents is their considerably low melting temperature, not higher than ~800° C., which makes the technological operations easier, allowing, for example, using the open crucibles while working under argon up to ~250 mbar (unlike the sealed containers according to [Chuntonov K., Voronin G. F., Malyshev O. B. US Pat. Application 20070196256, Aug. 23, 2007]).

Dendritic granules of any of the above mentioned alloys are obtained by vacuum evaporation under 200-300° C. of the volatile component, the fourth one, which is added to the dispersible melt before generation and quenching of the droplets. Sodium, introduced into the melt in small amounts, about 5÷15 at % of the total composition, served as such fourth component.

This choice of the additional component is explained by the fact, that Na, being completely solvable in any of the two initial melts L, when the quantitative ratio Na:L is ~1:9, at the same time does not form solutions with any of the components of the getter alloy in the solid state. Therefore the dendritic crystals of the primary ("getter") phase, which are growing in the process of quenching of the droplets, push aside the low-melting impurities, i.e. Na, into the spaces between the dendritic arms, by this preparing the appearance of the very two-phase structure and with the very phase disposition, which are necessary and sufficient for the successful implementation of the sublimation method (crystals of the peritectic phase Ag$_2$Na do not appear in the products of quenching perhaps due to the difficulties of the kinetic character).

In this structure each of the phase subsystems, the main "getter" one and the auxiliary volatile one, form multiconnected and mutually penetrating regions (FIG. 1A). After the complete evaporation of the volatile constituent the "getter" phase appears in a form of a bare dendritic carcass, which is the target of the given technology (FIG. 1B).

Granules with the structure of a dendritic carcass, having a diameter from 0.2 to 2.5 mm, are relatively large and mechanically strong particles with the developed surface and perfect venting properties. Unlike powder materials they are suitable for usage not only in gas purification processes and catalysis but also in vacuum technologies.

The described above granules are the progenitor of a whole family of new effective getter materials with a large variety of sorption characteristics and at the same time produced by simple and low cost operations like quenching of metallic droplets, vacuum evaporation of volatile substances and vacuum oxidation. Thus, terminating the process of evaporation of the volatile phase (in our case of sodium) at the certain moment we obtain a new material in a form of a composite, one constituent of which is the same dendritic carcass and another one is the residual Na taking the part of the space between the dendritic arms (FIG. 1C). These granules have an advantage over their prototype (FIG. 1B) in the processes of purification of hydrogen from gas impurities.

Another kind of dendritic composites appears as a result of the operation of the controlled oxidation of granules of the type shown in FIG. 1C at room temperature: subjecting granules with the residual Na to oxidation in vacuum, e.g. under the partial pressure of oxygen from $10^{-5}$ mbar to $10^{-3}$ mbar we obtain one more type of getter materials (FIG. 1D). The peculiarity of the latter ones is in their high ability to sorb moisture, whether we speak about gas purification or about maintenance of vacuum in sealed-off chambers.

Dendritic granules of the second or third type (FIG. 1C, FIG. 1D) are in the essence a concrete embodiment of those speculative constructions, which are rather vaguely described in [Sparks D. R., Najafi N., Newman B. E. US Pat. Application 20070205720] and before were materialized, though on a different material basis and by completely different methods in gas purification composites [Zeller R., Vroman C. U.S. Pat. No. 7,112,237, Sep. 26, 2006].

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1A, 1B, and 11D show the structure of the dendritic granules

DETAILED DESCRIPTION OF THE PREFERRED EMBODIMENTS

The process of obtaining dendritic granules comprises the following stages: preparation of the melt (I), dropping of the melt into a quenching medium (II), vacuum evaporation of the volatile constituent from solidified droplets (III), and, in certain cases, passivation treatment of the dendritic granules (IV). In the technological respect the given process is close to its prototype [Chuntonov K. US Pat. Application 20060225817, Oct. 12, 2006], but it also has essential distinctions associated with the different nature of the melt, with the new design of the apparatus itself, and with the new application field of the product.

Figure 2A:
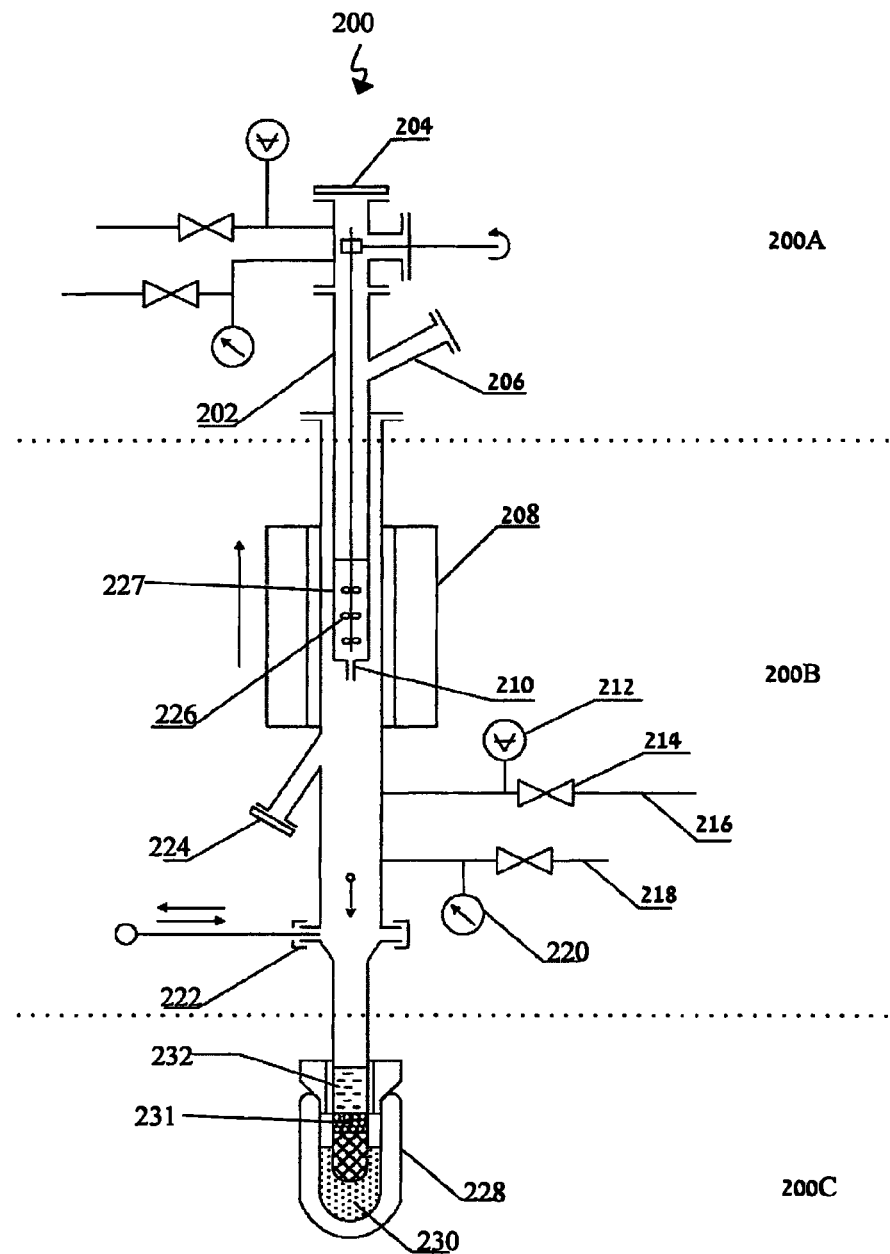
FIGS. 2A, 2B and 2C show the apparatus for the dendritic granules production

The scheme of the apparatus is shown in FIG. 2A: a technological column 200 with a charging compartment 200A, a melting chamber 200B, and a particle collector 200C serves for the production of solidified droplets. An evaporation chamber 250 (FIG. 2B) serves for evaporation of Na from these particles. The ready product in the form of dendritic granules is either directly packed in the gas purifier vessels or is sealed under argon for further usage.

I. Preparation of the Melt (FIG. 2A).

A crucible 202 is filled through a charging port 206 with pieces of the alloy $AgLi_2Mg$ or $(Ag_xCu_{1-x})_{0.6}Li_{0.4}$, where $0.6<x<0.75$, taken in a small deficiency of Mg or Cu, which is later compensated when Na is introduced into the melt. The column is evacuated, the melting chamber is heated with the help of an outside furnace 208 to 250-300° C., Ar is introduced into the column under the pressure from ~100 to 250 mbar and melting of the charge is started, until the first droplet appears at the exit of a capillary nozzle 210, observations being taken through a window 224. Immediately after this the furnace is moved upwards so that the melt in the capillary should crystallize and by doing so form a solid plug.

Further the charge is brought to complete melting using a window 204 for monitoring the state of the alloy; volatile metals are added to the melt by throwing magnesium or copper ampoules with Na into the crucible through the port 206. Metallic walls of the ampoules gradually dissolve in the melt bringing its composition to the calculated values regarding Mg or Cu and the released alkali metal is uniformly distributed in the volume with the help of a stirrer 226, which is necessary due to the low Na density compared to that of the melt.

So, directly before dispersion of the melt, its final composition according to the present invention should satisfy the following concentration conditions:
- alloys based on the intermediate phase $AgLi_2Mg$ should satisfy the condition $(AgLi_2Mg)_{1-y}Na_y$, where $0.05<y<0.15$;
- alloys based on eutectic Ag—Cu— in the boundaries between $(Ag_{0.45}Cu_{0.15}Li_{0.40})_{1-y}Na_y$ and $(Ag_{0.36}Cu_{0.24}Li_{0.40})_{1-y}Na_y$, where $0.05<y<0.15$.

II. Obtaining of Cast Beads (FIG. 2A).

Out of the two possible ways of droplet formation, jet disintegration and droplet flow of the melt, both can be used in the described method.

The pressing of the melt is started after lowering of the furnace 208 to the previous position: the capillary nozzle in this case is heated to the temperature of the whole melt and the permeability of the capillary channel is restored due to the melting of the alloy, which is inside. By reason of the pressure difference above and below the crucible, the melt flows through the capillary and the droplets fall into the particle collector 200C, which is filled with quenching liquid 232. A low-boiling alkane (pentane, hexane, or heptane) cooled from below with liquid nitrogen 230 is used as a quenching liquid.

The operation of the cryogenic compartment is set in such a way, that the temperature of the liquid alkane in the upper layers is equal to minus 75-80° C., and the height of the liquid column is not less than 10 cm. The intensive evaporation of the quenching liquid, when the heat energy from the molten droplets is transferred to it, raises the pressure in the space below the crucible and it is necessary to remove the alkane vapor continuously via a vacuum line 216 in order to provide a more or less constant dropping rate. The window 224 at this stage serves already not for the visual observation over the capillary, but as a place for the installation of a droplet counter, which controls the operation of a vacuum 216 and a gas 218 lines maintaining the outside pressure in the lower compartment of the column at the set level.

When the dropping process is over, argon is introduced into the column; and when the atmospheric pressure is achieved, the collector 200C with the solidified droplets is disconnected from the column and replaced by a new one. The used collector with the material after draining of the main mass of the quenching liquid is connected to the evaporation apparatus and completely dried there.

Figure 2B:
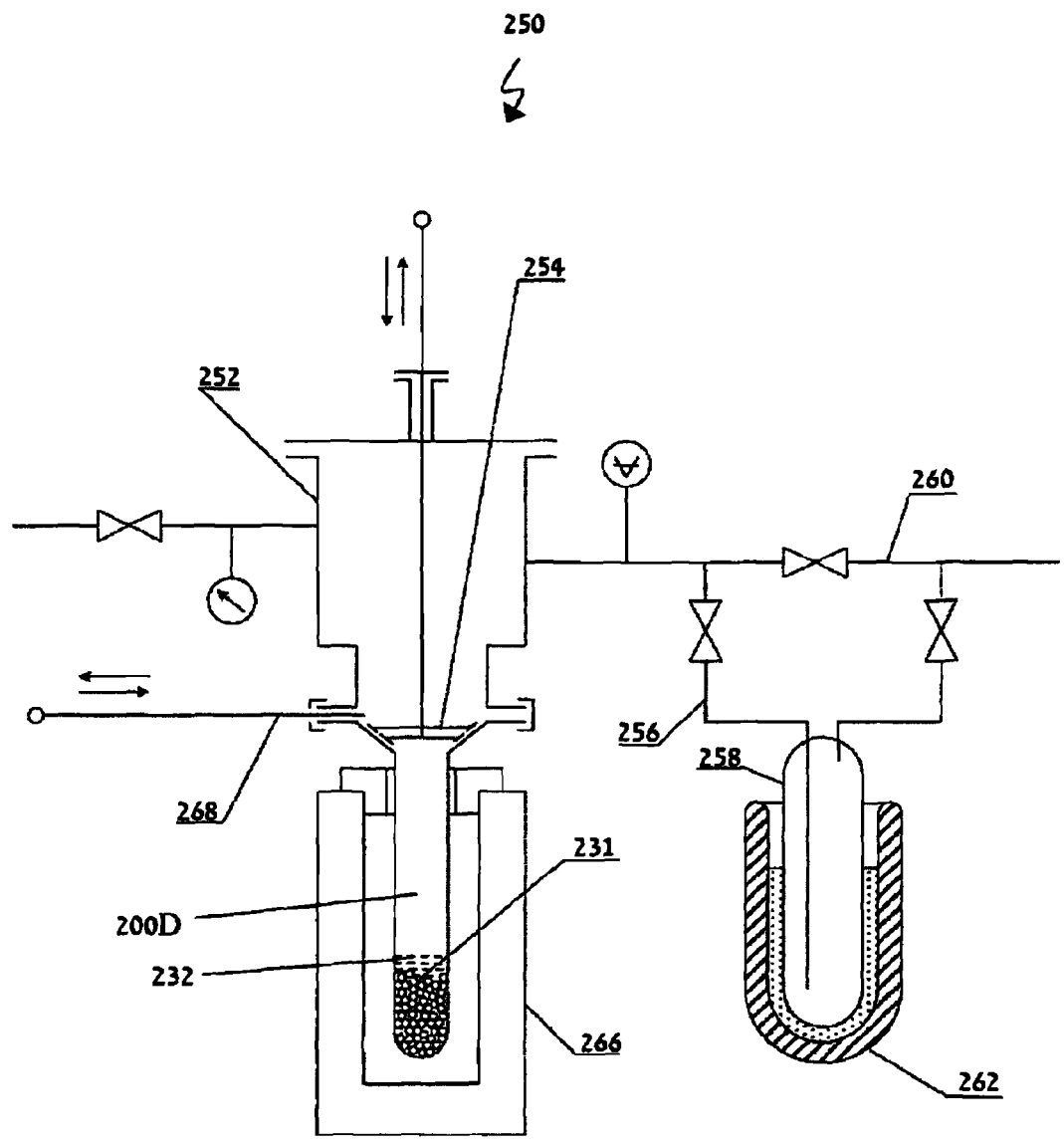

III. Thermovacuum Treatment (FIG. 2B).

An apparatus 250 is used for evaporation of Na. The collector 200D with the particles and the residual of the quenching liquid 232 is connected to a vacuum chamber 252 and at first is blown with argon for the removal of the air, which gets inside the collector during the draining of the main mass of alkane. Then the particles are dried by evacuation via a bypass line 256 with a nitrogen trap 262 for alkane vapor.

After this a shield 254, intended for localization of sodium condensate, is moved down. Then the main vacuum line 260 is operated and when the pressure in the system reaches $\sim 10^{-6}$ mbar the furnace 266 is switched on. The temperature of the furnace is slowly raised gradually achieving 200-300° C. and then maintained at this level till volatilization of sodium from the ampoules completes, which is indicated, in particular, by a sudden improvement of the vacuum in the chamber.

The furnace is switched off, moved down, argon is fed into the system and a valve 268 is closed. Finally, the collector is disconnected from the chamber 252 for reloading of the ready product. Charging of the dendritic granules into a gas purifier container is carried out under argon in a glove box. Or the granules are charged into a test tube for sealing under vacuum or under argon for storage.

Another variant of thermal treatment envisages performing vacuum evaporation of Na directly in a gas purifier vessel.

Figure 2C:
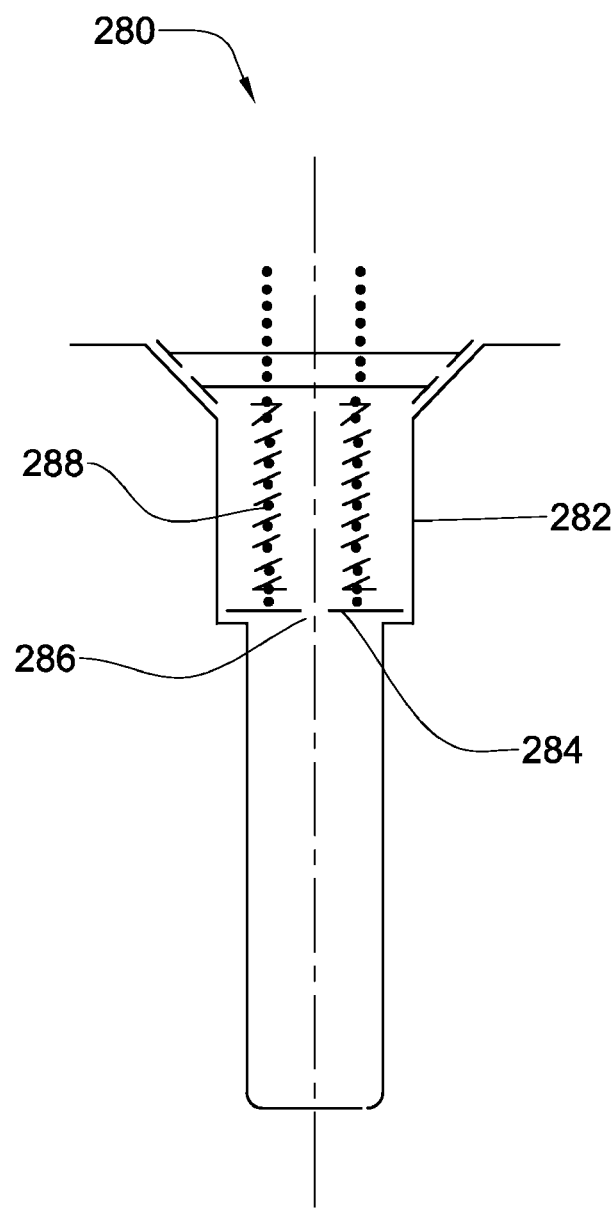

The described above procedure refers to the process of obtaining dendritic granules $AgLi_2Mg$ and $(Ag_xCu_{1-x})_{0.6}Li_{0.4}$, where $0.6<x<0.75$. Production of lithium composites differs in that in this case evaporation of Na is carried out only partially and for this reason needs tuning To provide more or less precise dosage of the evaporated metal a diaphragm with a central orifice 286 is introduced into the particle collector 289 (FIG. 2C). Then the collector turns into a sort of a Knudsen sell with a constant rate of evaporation of Na. Though the process rate decreases as the result, this provides the possibility to control the chemical composition of the granules.

IV. Treatment with Oxygen.

The surface oxidation of the granules and the transition of the metallic inclusions of Na into oxide form is a routine operation and do not require special skills. This treatment can be performed in the same apparatus, which serves for vacuum evaporation of Na (FIG. 2B). A rapid inlet of oxygen is inadmissible due to the danger of overheating of the getter mass, which can lead to the destruction of the dendritic structure. That is why oxygen should be fed into the chamber 252 (FIG. 2B) in a controlled way through the appropriate mass flow equipment under the pressure from $\sim 10^{-5}$ mbar to $10^{-3}$ mbar. The standard equipment used for the dynamic gas sorption measurements can be employed for the same purpose.

DESCRIPTION OF THE DRAWINGS

Figure 1A:
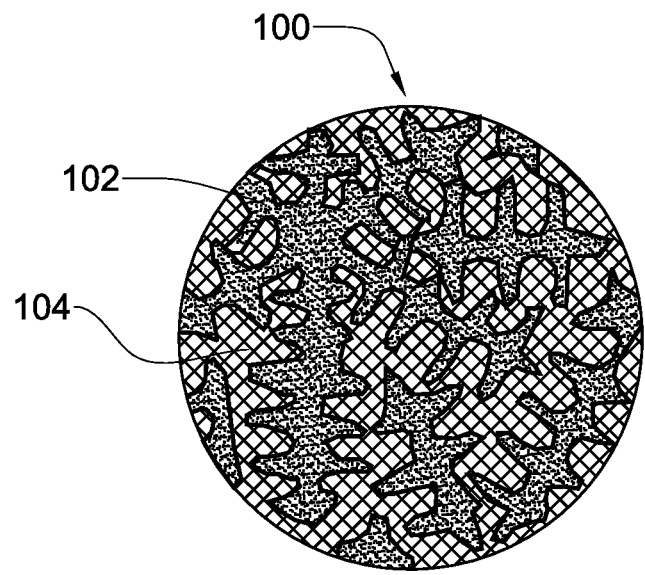

FIG. 1A. A cast granule 100 after quenching

Figure 1B:
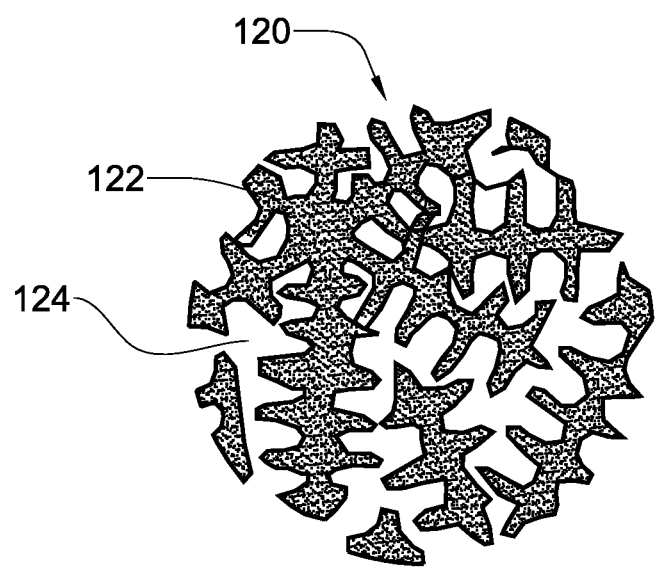

102—dendrites of the primary (getter) phase; 104—the volatile low-melting phase (Na) in the space between the dendritic arms of the primary phase FIG. 1B. A granule 120 after the vacuum evaporation of Na 122—a dendritic carcass; 124—interstices between dendritic arms A dendritic carcass in not obliged to be single-phase. On the contrary, it can be a combination of two or several phases.

So, in a ternary system Ag—Cu—Li this carcass can be eutectic, consisting of solid solutions of Li in Ag and solid solutions of Li in Cu.

Figure 1C:
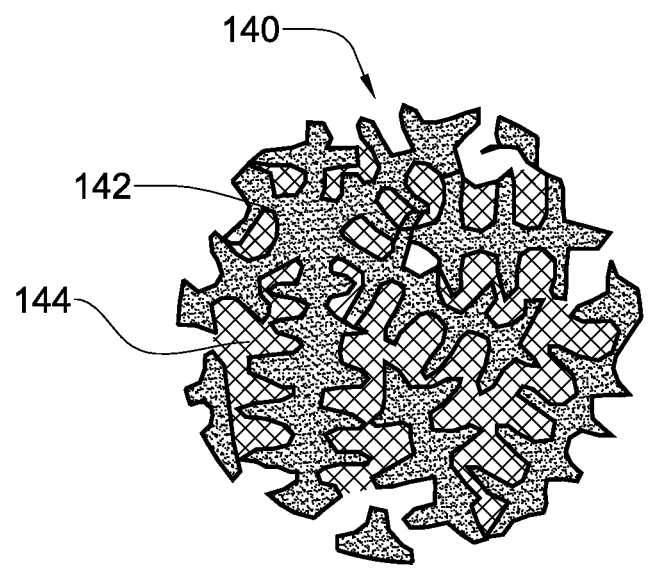
Figure 1D:
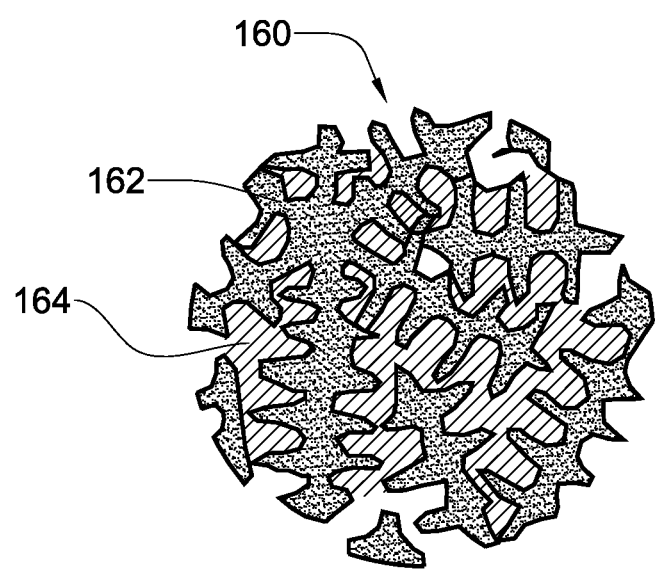

FIG. 1C. A granule 140 after partial evaporation of Na (an active composite) 142-a dendritic carcass; 144—remains of Na FIG. 1D. A granule 160 after oxidation (a passivated composite) 162—a dendritic carcass; 164—sodium oxide FIG. 2A. A technological column 200 for production of solidified spherical droplets 202—a metallic crucible, 204—a Pyrex or quartz window, 206—a port for charging the crucible with pieces of the alloy or ampoules with Na, 208—a movable furnace, 210—a capillary nozzle, 212—a pressure gauge in a vacuum line, 214—an adjustable vacuum valve, 216—a. line to a vacuum pump, 218—a gas line, 220—a pressure gauge in a gas line, 222—a vacuum gate valve, 224—a Pyrex window for observation over the droplets, 226—a stirrer, 228—a Dewar vessel, 230—liquid nitrogen, 231—solidified droplets, 232—a column of liquid alkane.

FIG. 2B. An apparatus 250 for evaporation of Na

252—a vacuum chamber, 254—a shield, 256—a bypass line, 258—a cryogenic trap for alkane vapor, 260—a vacuum main line, 262—a Dewar vessel, 231—solidified droplets, 232—quenching liquid, 266—a furnace, 268—a gate valve, 200D—collector.

FIG. 2C. A collector 280 with a diaphragm

Figure 3:
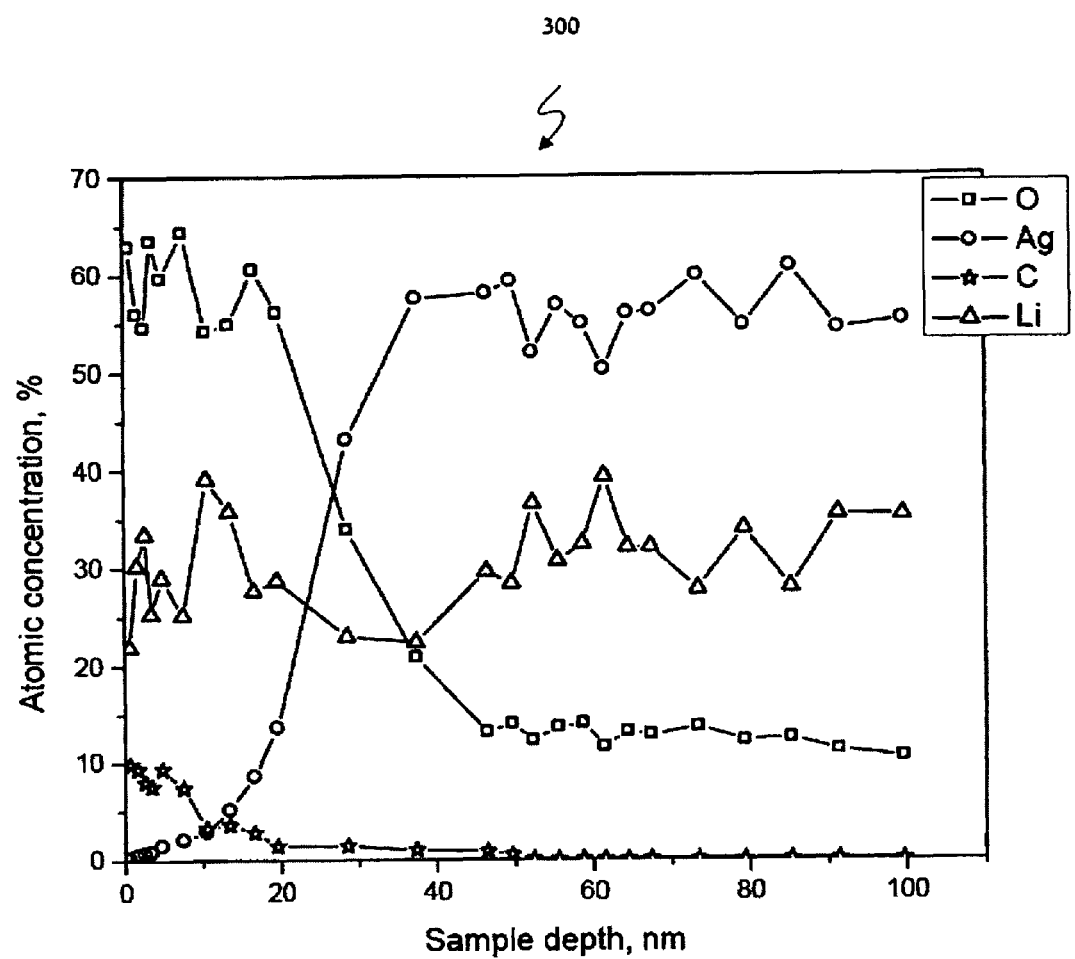
FIG. 3 shows the depth profile of the Ag-40 at % Li foil

282—a body of the collector, 284—a diaphragm, 286—an effusion orifice for the outlet of Na vapor, 288—a holder with a bumper FIG. 3 Depth profile of the surface of Ag-40 at % Li foil after an exposure to the air at room temperature for 1 hour.

The results of Auger surface analysis of Ag-40 at % Li foil are of principal importance. They not only define the order of the thickness of the passivated layer, but also answer the question about the mechanism of gas sorption by lithium solid solutions. The fact that the concentration of Ag in the passivated layer decreases from 60 at % in the volume to zero on the surface unambiguously indicates the dominating contribution of Li in the mass transfer during sorption. It is lithium that diffuses from the solid solution to the boundary alloy/products of reaction and then through the layer of the growing products to the boundary products/gas. And only a small constituent of the total mass transfer is carried out due to the penetration of oxygen atoms into the lithium alloy along the structure defects and grain boundaries.

Figure 4:
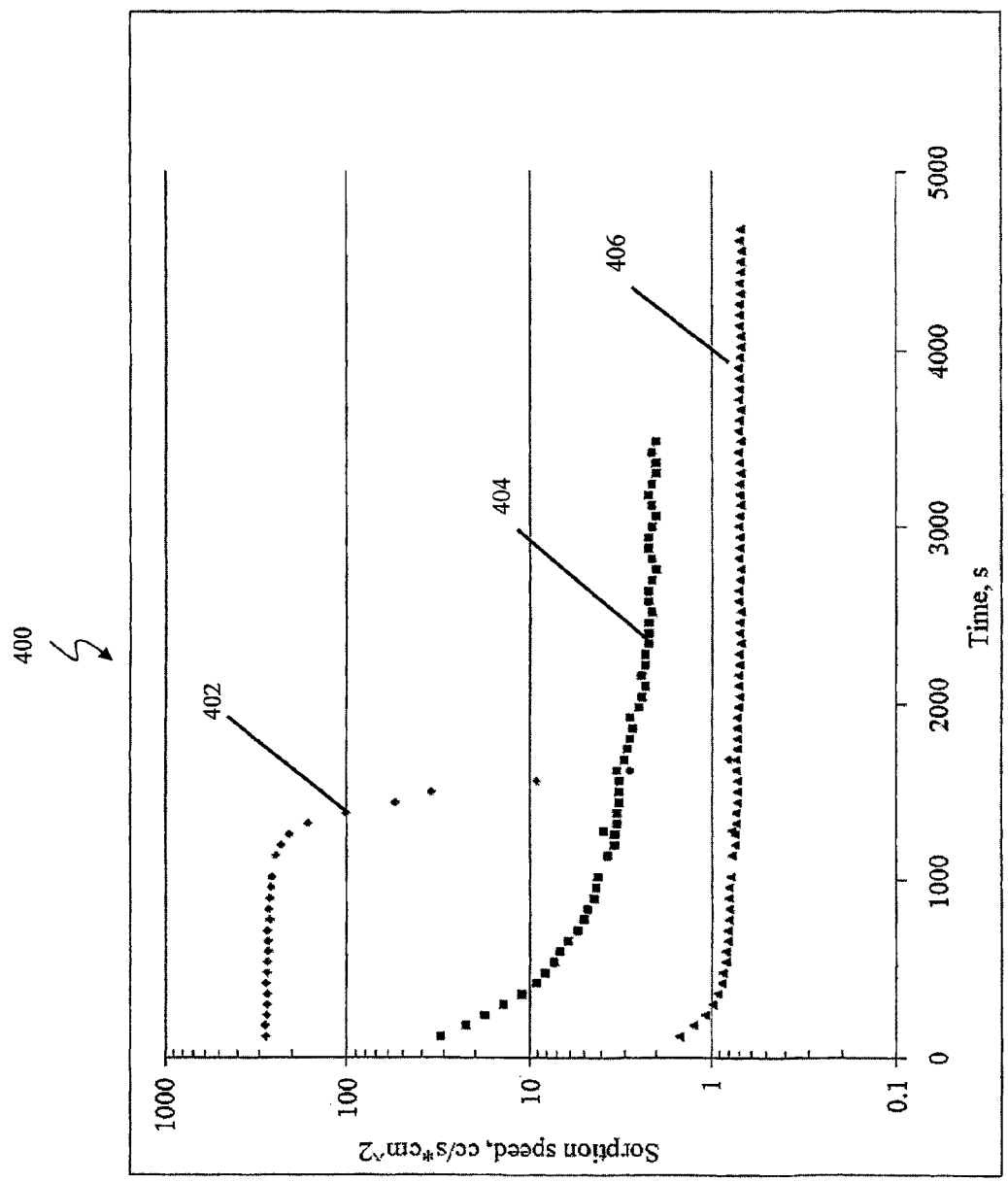
FIG. 4 CO$_2$ sorption by lithium getters

FIG. 4 $CO_2$ sorption by lithium getters

Figure 5:
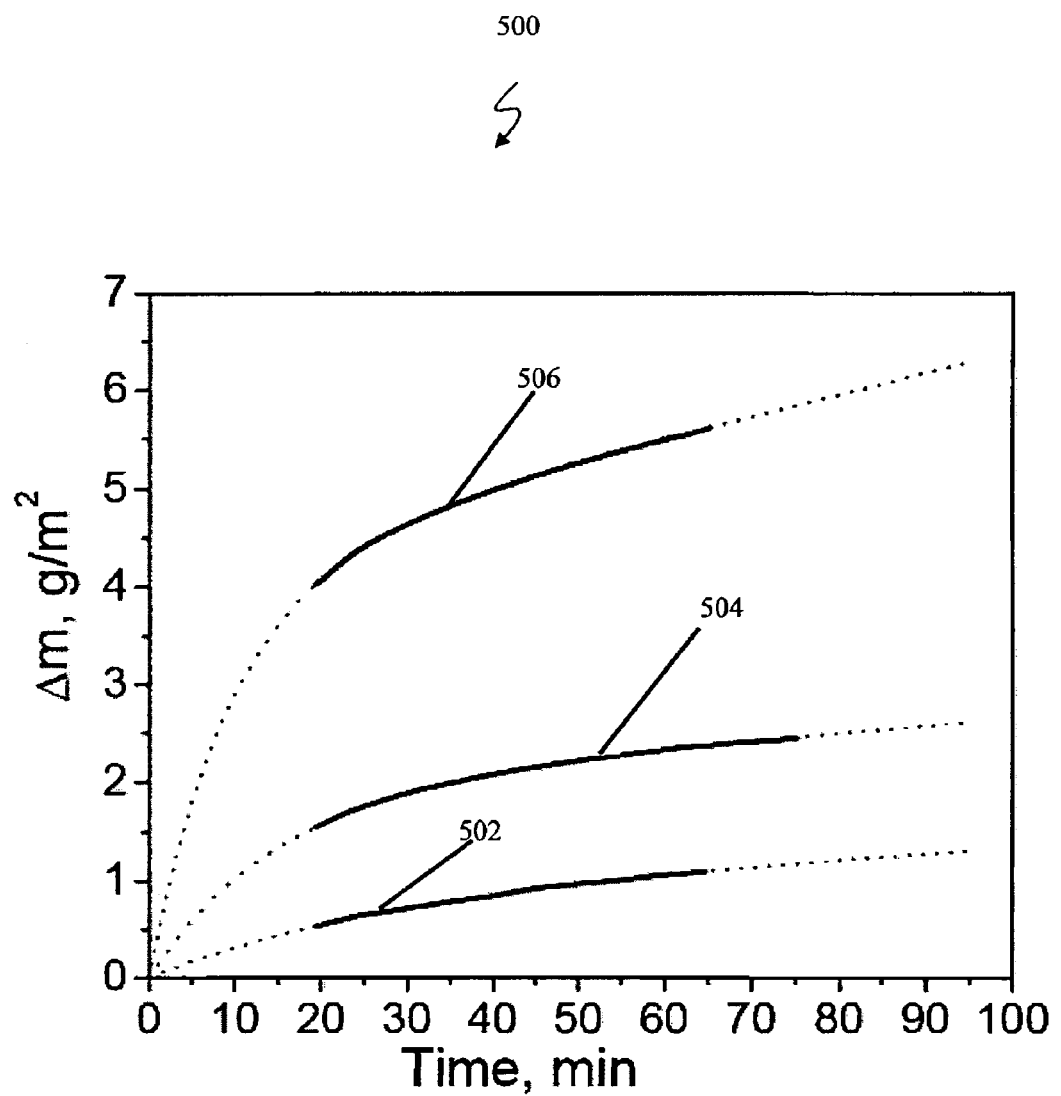
FIG. 5 Thermogravimetric curves for Ag-45 at % Li foil in a flow of N$_2$

402—Li-film 18 nm thick, room temperature, 404—Ag-50 at % Li foil 0.05 mm thick, 250° C., sorption pressure $3\times10^{-5}$ mbar, 406—Ag-50 at % Li foil 0.05 mm thick, 200° C., sorption pressure $3\times10^{-5}$ mbar FIG. 5 Thermogravimetric curves 800 for Ag-45 at % Li foil in $N_2$ flow 502—measured at 250° C., 504—measured at 300° C., 506—measured at 350° C. Solid line: experiment Dotted line: extrapolation The weight gain of foil pieces was measured using a microbalance in $N_2$ flow of the rate 0.1 slm and under nitrogen pressure of 1 bar.

The process runs according to a complicated scheme consisting of two mass flows. The first one includes diffusion of $N_2$ molecules in a gas phase through the boundary layer to the surface of the foil, dissociation of $N_2$ molecules into atoms and synthesis of lithium nitrides. The counter-current flow includes diffusion of Li atoms from the solid solution to the boundary alloy/lithium nitride, then lithium diffusion through the growing layer of lithium nitrides to the reaction boundary.

PRODUCT APPLICATION AND DISCUSSION

Dendritic granules of the composition $AgLi_2Mg$ with $Na_2O$ inclusions or without them and granules $(Ag_xCu_{1-x})_{0.6}Li_{0.4}$ with Na inclusions or without them can be considered as an alternative to the existing getter materials on the basis of transition metals Ti, V, Zr and Ni.

A new gas sorbent of composition $AgLi_2Mg$ the interstices between the dendritic arms of which can contain sodium oxide as a filling material, is intended for purification of inert gases from all active impurities and gas sorbents of composition $(Ag_xCu_{1-x})_{0.6}Li_{0.4}$, the interstices between the dendritic arms of which can contain sodium as a filling material, is intended for purification of hydrogen from $O_2$, CO, $CO_2$, $H_2O$ and $N_2$. These gas sorbents have sufficient advantages over the materials currently used for gas purification in all three points mentioned in the Background: in sorption capacity (1), safety (2), and simplicity of the production technology (3).

(1) The sorption capacity of dendritic gas sorbents of the mentioned composition greatly surpass the sorption capacity of the existing getters based on transition metals. The sorption capacity of sintered NEG materials, obtained from particles with a typical size of 10-150 μm, is extremely small at room temperature. The volume fraction of nickel nanoparticles in modern gas sorbents is not big either. At the same time the content of an active component in new dendritic getters is in the range of 40-70 at % and the fraction of the material, which manages to react with gases at room temperature before the sorption rate goes down to the level, which is unacceptable for gas purification (in vacuum applications a kinetic threshold of the material applicability is much lower because in this case the competition between the sorption rate and the leakage rate takes place, and in vacuum devices the latter one should be minimized), is equal in average to approximately 15-20%.

Transition metals demonstrate the usage factor, which is so high, only at the temperature around 800° C. [Baker J. D., Meikrantz D. H., Pawelko R. J., Anderl R. A., Tuggle D. G., J. Vac. Sci. Technol. A, 12 (1994) 548], whereas in the temperature range of 350-500° C. transition metals demonstrate the sorption capacity of not more than 1% of the theoretical limit [Succi M., Solcia C. U.S. Pat. No. 6,436,352, Aug. 20, 2002]. However, high temperatures are contraindicative in the processes of high gas purification because the side reactions take place at these temperatures and their products contaminate the purified gas [Carrea G., Warrick B. D., U.S. Pat. No. 6,261,528, Jul. 17, 2001]. As-made surface of Li solid solution sorbs gases at room temperature very fast till the film of products several nanometers thick appear, after which the process rate abruptly slows down untill at last it stabilizes on a low level at the thickness of the passivated layer of 35-50 nm (FIG. 3). In this state the material completely preserves the ability to work as a getter pump in pumping down residual gases in vacuum sealed-off chambers. However to use the passivated granules as a purifying agent in gas streams they have to be heated though to moderate temperatures of 150-250° C.

The results of sorption tests performed for Ag-50 at % Li foils at temperatures of 250° C. and 200° C. (FIG. 4) can serve as a proof of workability of the passivated Li alloys: it can be seen that the curves do not show any trend to sorption rate decrease with time and the numerical results show that the rate of sorption of oxygen containing gases by the lithium material is by ~300 times higher than what transition metals, e.g. $Ni_5Pr$ intermetallic compounds, are able for [Gozzi D., Iervolino M., Latini A., Bellucci A., Vacuum, 80 (2006) 930].

Another test is shown in FIG. 5, where the results of thermogravimetric analysis of passivated Ag-45 at % Li foils in the flow of $N_2$ under the pressure of 1 bar are given. It can be seen that the rate of binding nitrogen, which is usually difficult for gettering, is very high, amounting $\sim 2\times 10^{-5}$ mg/cm$^2$s at the temperature of 250° C.

It should also be mentioned that in both of the discussed cases dense foils with a smooth surface were used, whereas the sorption rate greatly depends on the surface geometry. The presence of the open pores and channels going from the surface to the depth of the material can by many times increase the sorption rate. Thus, assuming for the passivated surface that the sticking coefficient is 0.01, which seems reasonable for the oxides, and the fraction of holes on the surface of the dendritic granules is 0.1, which corresponds to their real composition and structure, we get according to the sorption model [Chuntonov K., Setina J., J. Alloys Compd., 455 (2008) 489], that the rate of sorption of gases by dendritic granules should increase compared with dense foils by $(0.01\times 0.9+1.0\times 0.1)/0.01\times 1.0 \approx 11$ times.

(2) The fact that the sorption rate abruptly slows down when the film of the products reaches a certain thickness, in other words, passivates, is in principle important. The threshold thickness of the passivated film itself can be different, but the fact of its existence is important as it indicates the stability of the material to abrupt changes in the concentration of active gases.

At breakdowns the appearance of the oxide layer on the surface saves part of the getter material, playing the role of a sacrificial layer. During the normal work of the material at purification of gas streams from impurities the formation of a passivation layer at room temperature is a natural result of the sorption process. Still in the latter case sorption can be prolonged by heating the material. In this case the sorption rate will depend on the temperature of the getter.

For each sort of granules the fraction of the material $S_0$, able to react with gases at room temperature as well as the fraction of the material $S_T$, which needs heating, is known in advance. Representing dendritic granules as an assemblage of cylindrical needles with an average diameter d, we get for these values $$S_0, \% = \frac{\Delta h}{0.5d}\left(2 - \frac{\Delta h}{0.5d}\right)\times 100; S_T\% = 100 - S_0.$$

where $\Delta h$ is a threshold thickness of the passivated layer, i.e. the thickness starting from which the process of gas purification looses its practical sense. Thus, for Ag-40 at % Li granules with $\Delta h$ z 40 nm and the diameter of dendritic arms about 0.08 μm we have $S_0 \approx 100\%$, under the same conditions and the diameter of dendritic arms 0.8 μm we have $S_0 = 19\%$ and, finally, at the diameter of dendritic arms 8 μm we have $S_0 = 2\%$. The same values of $S_0$ indicate the maximum damage for the material at its exposure to the air.

So, diameter d is one of the main parameters, determining the performance attributes of the dendritic materials. In this connection the attractiveness of the given materials grows, as far as it is possible to control the value d at the stage of obtaining the granules: diameter d as well as dendritic arm spaces depend mainly on the rate of quenching the droplets, and the rate of quenching the droplets is the function of their size, i.e. by changing the size of the droplets we set the value $S_0$ [Chuntonov K. US Pat. Application 20060225817, Oct. 12, 2006].

So, while HPTF-getters (by SAES Getters Group) immediately passivate at a sudden contact with the air and nanopowders of transition metals burn completely, dendritic granules on the basis of Li solid solutions under the same conditions though also passivate, but comparatively slowly, so that in this case measures can be taken to save the material. Besides, the level of the possible loses can be planned and part of the getter material survives in any case.

(3) The equipment for producing dendritic granules is simple enough and the technological process takes a short time, only a few hours in contrast to tens of hours necessary for the production of powder purification materials. The structure of the dendritic carcass is the product of the fast self-assembly (seconds during the quenching of the melt droplets) with the further short procedure of vacuum evaporation of Na and its oxidation (minutes). That is, here we deal with the rare exception when a new and a more perfect product immediately appears to be preferable in cost respect than its predecessors. Dendritic granules of the shown in FIG. Ia, b, c, d type are a ready purification agent, which easily fits in the existing gas infrastructure not requiring any adjustments. A metallic vessel, filled with dendritic granules, is connected to a gas line and at the first stage purification of gas stream is performed at room temperature. Then, when the layer of products on the surface of dendritic arms reach in thickness the value Ah, the second sorption stage is started, during which the material is activated, raising its temperature as the active component is depleted. In this way it is possible to manage a complete yield of the getter material not exceeding at this the temperature of 250° C.

The purification process described above is controllable and can be easily adjusted both to the new requirements and to the known standards. Let us consider the case of gas purifiers working at the first stage without heating. Let it be required to perform continuous purification of a gas from the level of 99.999% of the base substance to the level of 99.9999999% during a year at the flow rate 3 slm and the pressure 1.5 bar. Let us take for a vessel a steel cylindrical container 51 mm in diameter and 371 mm long, and fill it with dendritic granules, 0.3 mm diameter and with Li concentration not lower than 45 at % and an average diameter of dendritic arms d≈0.8 μm.

The whole charge contains ~190 g of Li. A fraction of 20% from this amount is equal to 37.8 g, which completely covers the demand for lithium required for binding of 31.6 g of gas impurities contained in the total mass of gases flowing through the discussed gas purifier during a year.

After the first year of operation the usage of the new gas sorbent is not terminated. Raising the temperature of the getter mass gradually e.g. in the beginning to 75-80° C., then to 120-125° C., further on to 175-180° C. and finally to 220-250° C., the life span of gas purifiers for four years more, during which the remaining 80% of the sorption potential of the dendritic granules will be spent. At the same time commercially available purifiers, e.g. by Matheson TriGAS, NuPure or Entegris, usually have a life span from one to two years, after which they are to be returned to the manufacturer for regeneration of the purification agent.

Other advantages of a charge from dendritic granules are its small resistance to gas streams and also the possibility of performing vacuum outgassing of the getter material directly before the beginning of the work. Resume:

1. A new gas sorbent for purification of gas streams of hydrogen and also a new gas sorbent for purification of inert gases from unwanted impurities, aimed for using the existing gas equipment, have been developed.

2. The gas sorbent consists of dendritic granules of lithium alloy or composites on the basis of the mentioned dendritic granules, which can be charged into a standard gas purifier vessel by filling under argon. After this the getter material can be subjected to vacuum outgassing at the temperature of 150-200° C. already in the gas purifier vessel. Another variant of charging allows filling of the quenched granules and their further treatment with the obtaining of the end product directly in the gas sorbent vessel.

The granules can have a composition AgLi$_2$Mg and contain in the interstices between the dendritic arms up to 0.20 mole fractions of Na$_2$O or a composition $(Ag_xCu_{1-x})_{0.6}Li_{0.4}$ and contain in the interstices between the dendritic arms up to 0.15 mole fractions of Na. Each product can be used either separately or in a mechanical mixture with a purification material of a different composition. For example, in purification of inert gases it is possible to admix pure powders of Nb, Sc, Pd, etc. to AgLi$_2$Mg granules.

3. Dendritic granules $(Ag_xCu_{1-x})_{0.6}Li_{0.4}$ with or without Na are the best means for purification of hydrogen from all active gases: nitrogen, one of the most difficult gases to remove, is sorbed, for example, at 250° C. with the rate of ~0.2 mg/s per 1 g of gas sorbent; oxygen and also CO and CO$_2$ are sorbed by these granules approximately 50 times faster, then N$_2$; water vapor partially reacts with Na and Li oxides forming NaOH and LiOH and partially with the atoms of alkali metals according to the scheme

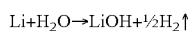

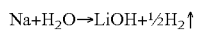

4. Dendritic granules AgLi$_2$Mg and especially Na$_2$O containing composites based on passivated dendritic granules AgLi$_2$Mg remove practically completely all the active gases from the streams of inert gases. At this the passivated film on the surface of the dendritic carcass as well as Na$_2$O inclusions act as strong purifiers binding CO, CO$_2$, and H$_2$O and preventing at the same time the appearance of the secondary hydrogen.

5. Dendritic granules on the basis of Li solid solutions are stable to chemical shock. This ability to survival is conditioned by the fact that at the first, diffusion-free stage of the sorption process, when the thermal activation is not needed, only the atoms of a thin surface layer react with gases, while the main mass of the active component is protected from the contact with gases by the matrix of the metal-dissolvent.

6. The usage factor of the new gas sorbent can be maximized if the sorption process is performed in two stages: the first one at room temperature and the second one—with heating of the material but not higher than 250° C.

7. The technology of manufacturing of the new gas sorbent is simple, well reproducible, and does not demand expensive equipment. Its most important advantage is small time costs for performing the main production operations. These time costs are estimated in seconds or minutes and not in tens of hours like it happens in the production of powder gas sorbents.

Let us mention, for better understanding of the elements of novelty containing in the given invention, its difference from its prototype [Chuntonov K. US Pat. Application 20060225817, Oct. 12, 2006]:

1. New getter product with a structure of a dendritic carcass has been developed. The basis of this structure is solid solutions of Li, opposite to intermetallic compounds of Ca and Sr. This change of the gas sorbent composition leads to the appearance in it of a new important property-stability to a chemical shock. The new product includes also getter composites, in which the dendritic carcass of the lithium alloy fulfills a double function, a sorption one and a construction one, providing the integrity of the getter material due to the retention of the second phase, in the given case, Na or Na$_2$O,
in the channels between the dendritic arms. This second phase, possessing high chemical affinity with O$_2$ and H$_2$O (inclusions of Na) or only to H$_2$O (inclusions of Na$_2$O), enhances the sorption operation of the solid solution of lithium.

Finally, one more useful peculiarity of the new material consists in its sufficient strength combined with the moderate ductility, which is a valuable feature in operations of loading/unloading of granules, which is an advantage of solid solutions over brittle inclined to breakage intermetallic compounds.

2. The change in the method of production of getter granules is also sufficient and concerns both the equipment, which used, and the technological process. Let us mention in this connection, that the thermovacuum treatment of the lithium alloy has here a more radical character. The initial alloy here is not more than a precursor: from the four types of the end product, two types of dendritic alloys and two types of composites only in the case of the composite $(Ag_xCu_{1-x})_{0.6}Li_{0.4}$ with Na inclusions the changes in the composition come down to changes in quantitative relations between the initial components. In the rest cases the elementary composition itself changes: the dendritic granules AgLi$_2$Mg and $(Ag_xCu_{1-x})_{0.6}Li_{0.4}$ completely lose Na and the getter composite $(AgLi_2Mg)_{1-y}(Na_2O)_y$ acquires a new component—oxygen. The given differences are the result of changing the procedure in the method of the production of the new material: introducing the operation of oxidation of granules under low oxygen pressure and changing the procedure of Na evaporation, which is now performed not from the solid state, but from the liquid one.

3. Dendritic granules based on intermetallic compounds of Ca and Sr as well as dendritic granules based on solid solutions of Li are equally useful both for purification of gas streams from impurities and for sorption of residual gases in vacuum devices. The difference in the methods of using these materials is that the first ones are able to react with gases to completion at room temperature whereas the second ones due to their inclination to passivation in gas purification usually need a small heating to activate Li diffusion.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for preparing a getter material, the method comprising:
    preparing a melt of a lithium alloy together with sodium (Na), the lithium based alloy comprising lithium (Li), silver (Ag), and at least one element selected from magnesium (Mg) and copper (Cu);
    dropping the melt of the lithium alloy into a quenching liquid to produce granules, wherein each granule comprises a dendritic carcass of the solid solution of lithium and interdendritic space at least partially filled with sodium and/or sodium oxide; and
    evaporating said sodium from the granules by applying a thermovacuum treatment to the granules until a predetermined sodium concentration is achieved.

2. The method of claim 1, wherein said dropping of the melt of the lithium alloy into the quenching liquid is carried out in an argon (Ar) medium.

3. The method of claim 1, wherein the solid solution of lithium is: $(Ag_xCu_{1-x})_{0.6}Li_{0.4}$, where $0.6 \leq x \leq 0.75$.

4. The method of claim 1, wherein said predetermined dimensions of the granules are substantially in the range of 0.2 mm to 2.5 mm.

5. The method of claim 1, wherein said evaporating of said sodium from the granules is carried out at a temperature selected from the range from about 200° C. to about 300° C.

6. The method of claim 1, wherein said evaporating of sodium provides partial vaporization of sodium from the granules, thereby forming an active composite.

7. The method of claim 6, further comprising oxidizing the granules to transform at least a part of said sodium into said sodium oxide ($Na_2O$), thereby forming a passivated composite.

8. The method of claim 7, wherein said oxidizing of the granules is carried out at an oxygen pressure selected from the range of from about $10^{-5}$ mbar to about $10^{-3}$ mbar.

9. Gas sorbent granules, each granule comprising
a dendritic carcass of a solid solution of lithium and
interdendritic space at least partially filled with sodium and/or sodium oxide.

10. The granules of claim 9, wherein the solid solution of lithium is $(Ag_xCu_{1-x})_{0.6}Li_{0.4}$, where $0.6 \leq x \leq 0.75$.

11. The granules of claim 9, wherein the solid solution of lithium is $AgLi_2Mg$.

12. The granules of claim 9, wherein dimensions of the granules are substantially in the range of 0.2 mm to 2.5 mm.

13. A process comprising purifying a gas in a gas stream by flowing the gas stream through a getter material comprising granules, wherein each granule comprises a dendritic carcass of the solid solution of lithium and interdendritic space at least partially filled with sodium and/or sodium oxide.

14. The process of claim 13, wherein said step of flowing the gas stream is carried out at a first stage at a first temperature, and then at a second stage at a second temperature that is greater than the first temperature.

15. The process of claim 13, wherein said gas is an inert gas, the solid solution of lithium is $AgLi_2Mg$, said first temperature is a room temperature, and said second temperature is 100° C.

16. The process of claim 13, wherein said gas is hydrogen, said solid solution of lithium is $(Ag_xCu_{1-x})_{0.6}Li_{0.4}$, where $0.6 \leq x \leq 0.75$, said first temperature is a room temperature, and said second temperature is 250° C.

* * * * *